US005212502A

United States Patent [19]

Bowling

[11] Patent Number: 5,212,502

[45] Date of Patent: May 18, 1993

[54] INK JET PRINT HEAD MOUNTING MECHANISM

[75] Inventor: Bruce A. Bowling, Beavercreek, Ohio

[73] Assignee: Eastman Kodak Company, Rochester, N.Y.

[21] Appl. No.: 845,987

[22] Filed: Mar. 4, 1992

[51] Int. Cl.[5] .......... G01D 15/16

[52] U.S. Cl. .......... 346/140 R; 346/139 C; 400/175; 400/352

[58] Field of Search .......... 346/140 R, 139 C; 400/175, 352

[56] References Cited

U.S. PATENT DOCUMENTS 4,736,213 4/1988 Piatt et al. .......... 346/140

4,755,836 7/1988 Ta et al. .......... 346/140 R

FOREIGN PATENT DOCUMENTS 0313205 4/1989 European Pat. Off. .......... 400/175

*Primary Examiner*—Benjamin R. Fuller

*Assistant Examiner*—David Yockey

*Attorney, Agent, or Firm*—Thomas H. Close

[57] ABSTRACT

An exact constraint mounting is provided between the print head and the carriage of an ink jet printer. The mounting scheme includes three generally spherical alignment features on the carriage, a conical depression on the print head for cooperating with a first alignment feature to define a point, a trough on the print head for cooperating with a second alignment feature to define a line through the point, and a flat on the print head for cooperating with the third alignment feature to define a rotation about the line. The improved mounting system results in a highly precise, repeatable, stress-free mounting for the print head.

9 Claims, 2 Drawing Sheets

INK JET PRINT HEAD MOUNTING MECHANISM

FIELD OF THE INVENTION

The present invention relates to ink jet printing apparatus of the type having insertable print cartridges carried by a carriage and more particularly to apparatus for accurately aligning said print cartridges with respect to said carriage.

BACKGROUND ART

There are known drop on demand ink jet printer systems in which a print head carriage assembly, which supports a print head, traverses the print head across the width of a print medium in line printing operation. Between lines, the print receiving medium is advanced to prepare for the next line printing sequence. One well known approach is to construct the print head as a unitary, disposable print cartridge which contains an ink supply, drop generating structures, and electrical connections adapted for electrically coupling the print head to the printer which provides drop generating energy in response to print information signals generated by the ink jet printer.

Heretofore, prior art ink jet printers have typically controlled up to five degrees of freedom of the position of the print head with respect to the carriage. Prior art designs have employed various combinations of pad to pad, pin and slot, and knife edge to detent surface alignment schemes. See for example U.S. Pat. No. 4,736,213 issued Apr. 5, 1988, where a cartridge having two alignment pins and a detent surface cooperates with a carriage having two slots and a knife edge to align the cartridge to the carriage. Some of the prior art schemes result in over constraining the cartridge in one or more degrees of freedom, thereby introducing strain and possible distortion of the cartridge, whereas other schemes as noted above underconstrain the cartridge introducing unreliability in the carriage to cartridge interface in one or more degrees of freedom. As the number of ink jets and hence the number of electrical connections to the print head has grown in recent years, it has become increasingly important to precisely locate and exactly constrain the print head with respect to the cartridge. The term exactly constrain as employed herein means to fix each of the three directions x, y and z, and each of the three possible rotations about these directions (all six possible degrees of freedom) without overconstraining any one of the degrees of freedom, thereby avoiding induced stress at the interface. Furthermore, it is desirable to make the ink jet apparatus as small as possible to be portable. Since pads or location planes occurring on adjacent mounting surfaces require considerable area, it is desirable to avoid the use of pad to pad location features.

SUMMARY OF THE INVENTION

It is an object of the present invention to provide an improved mounting scheme for an ink jet print head in a carriage of an ink jet printer that avoids the problems noted above.

The object is achieved according to the present invention by providing a system for exactly constraining the ink jet print head in the carriage including a first alignment feature between the print head and the carriage for uniquely defining a point, a second alignment feature between the print head and the carriage for uniquely determining a line through the point, and a third alignment feature between the print head and the carriage for uniquely determining a rotation about the line. In a preferred mode of carrying out the invention, the first alignment feature is a generally spherical boss on the carriage that cooperates with a conical indentation on the print head to define a point; the second alignment feature is a generally spherical boss on the carriage that cooperates with a trough on the print head to define a line through the point, and the third alignment feature is a generally spherical boss on the carriage that cooperates with a flat on the print head to define a rotation about the line. In the preferred embodiment, mating planar electrical contacts are located on the carriage and the print head in a plane defined by the three locating features, and a cam is provided on the carriage for urging the print head into engagement with the carriage alignment features.

MODES OF CARRYING OUT THE INVENTION

Figure 1:
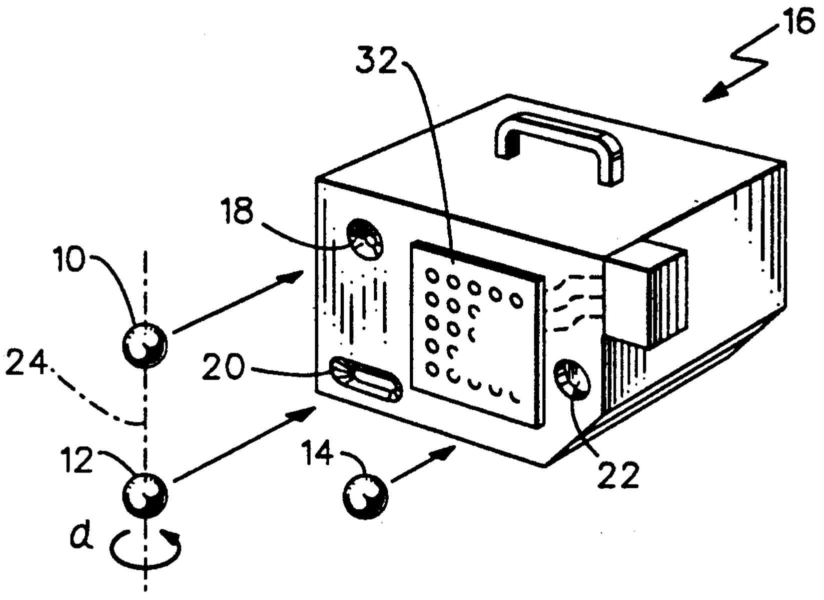
FIG. 1 is a perspective view of an inkjet print head cartridge, illustrating the principle of operation of the exact constraint alignment system of the present invention.

The principles of operation of the present invention will first be described with reference to FIG. 1, where there is shown three spheres 10, 12 and 14, arranged in a triangular pattern and representing three alignment features which may be provided on a part to be aligned with an ink jet print head cartridge, generally designated 16. Cartridge 16 defines three alignment features for cooperating with the three spherical alignment features: a conical depression 18; a trough 20 having sloping sides; and a recessed flat 22. When sphere 10 is moved into engagement with conical depression 18, a point is defined e.g. the center of sphere 10. Assuming that spheres 10, 12 and 14 are rigidly connected, when sphere 12 is seated into trough 20, a line is defined e.g. a line 24 between the centers of sphere 10 and 12. Finally, when sphere 14 is brought into contact with recessed flat 22, a rotation $\alpha$ about line 24 is uniquely defined and all six degrees of freedom between an object bearing the spherical alignment features and the cartridge 16 are exactly constrained. It should be noted that there is no overconstraint in this system, i.e. a surface bearing the alignment spheres 10, 12 and 14 would not experience any stress due to the constraints.

Figure 2:
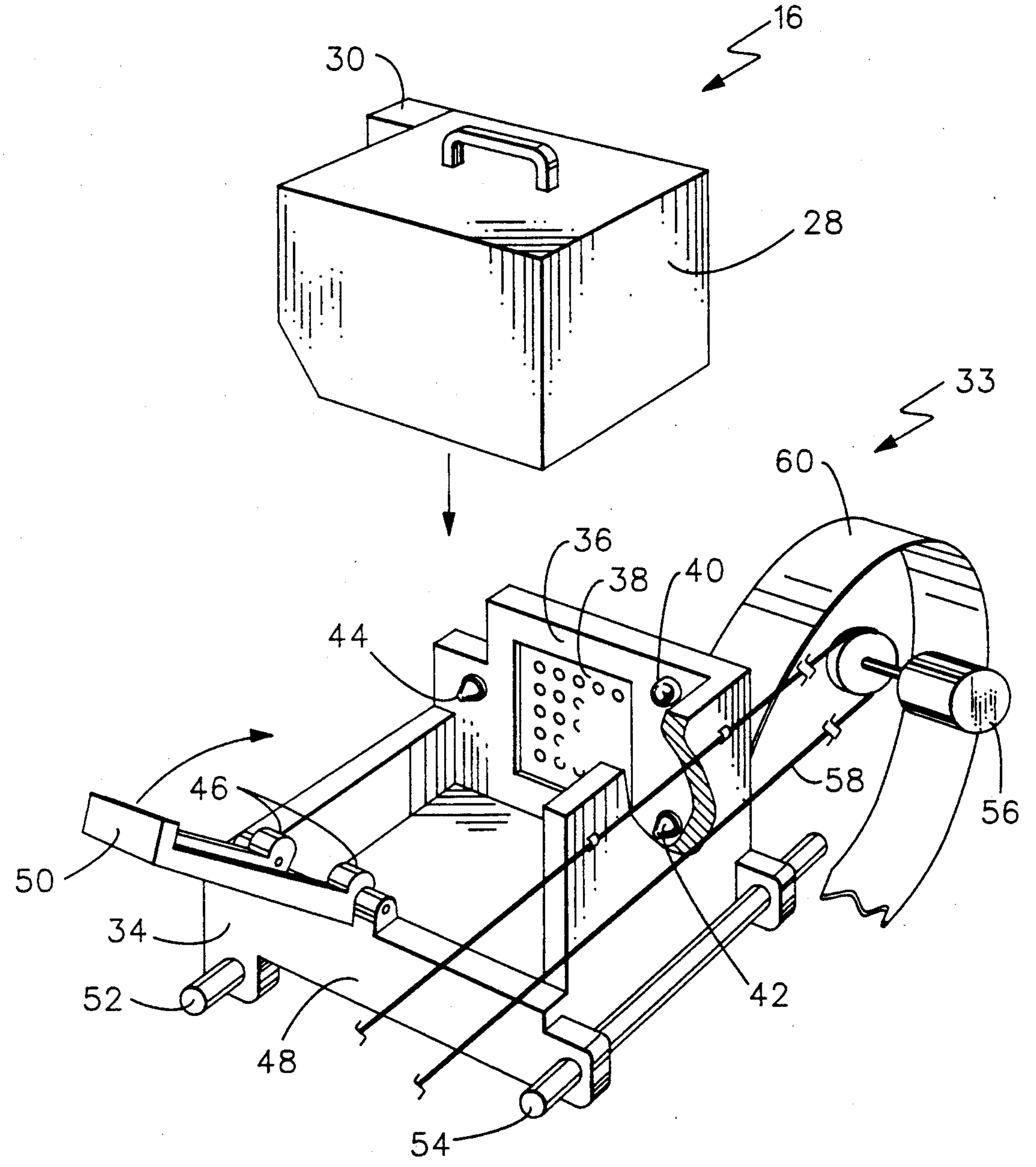
FIG. 2 is a perspective view of an ink jet print head cartridge and carriage according to the present invention.

Turning now to FIG. 2, an ink jet print head and carriage employing the exact constraint alignment system according to the present invention are shown. The print head generally designated 16 includes a body 28 containing an ink reservoir, an ink drop generator 30 connected to the ink reservoir, and a generally planar electrical contact pad 32 (shown in FIG. 1) for connecting the ink drop generator 30 to the electronics of the ink jet printer (not shown). As shown in FIG. 1, one side of the ink jet print head 16 defines three alignment features arranged in a triangular pattern, a conical depression 18, a trough 20 with sloping sides, and a recessed flat 22.

A carriage, generally designated 33, includes a cradle 34 (shown partially broken away) for receiving the print head 16. On one wall 36 of the cradle 34 is a planar array of electrical contacts 38 adapted to mate with the contacts 32 on the print head 16. Three generally spherical alignment features 40, 42, and 44 are provided on the wall 36 of the cradle 34. A pair of cams 48 is mounted in an opposite wall 46 of the cradle 34. When the print head 16 is inserted into the cradle 34, the cams are actuated by a lever 50 to urge the print head into engagement with the electrical contacts 38 and the alignment features on wall 36.

In operation, carriage 34 is moved along a pair of shafts 52 and 54 by a motor 56 that drives a cable 58 connected to the carriage 34. A flexible electrical connector 60 provides electrical connection to the contacts 38 in the carriage to the ink jet printer electronics (not shown).

Preferably, the generally spherical alignment feature 40 on wall 36 is a spherical ball boss and alignment features 42 and 44 are generally spherically tipped conical bosses that can be molded or otherwise formed in wall 36. Alternatively, the alignment features 40, 42 and 44 may all comprise spherical bosses, and may be formed for example by embedding ball bearings in the surface of wall 36. It will be appreciated that any one or more of the alignment features can be reversed from the preferred arrangement shown i.e., the spherical alignment feature 40 may be provided on the ink jet print head 56, and the conical depression, trough, or flat provided on the carriage 34.

ADVANTAGES

The present invention is advantageous in that an ink jet print head in precisely aligned in a carriage without over or under constraint, resulting is improved drop placement accuracy and exact control of print quality, improved registration of the electrical contacts in the print head and carriage, no excessive force or stress required for the print head to seek the constraints, simple insertion to one mounting plane, and 100% interchangeability between print heads.

I claim:

1. An ink jet print cartridge for use in an ink jet printer having a carriage for receiving the cartridge in a constrained position, the carriage defining three alignment features arranged in a triangular pattern, comprising:

a. first means defined by said cartridge for cooperating with a first one of said alignment features so as to define a point wherein said first one of said alignment features and said first cooperating means respectively comprise a generally spherical boss and a conical recession;

b. second means defined by said cartridge for cooperating with a second one of said alignment features so as to define a line through said point wherein said second one of said alignment features and said second cooperating means respectively comprise a generally spherical boss and a trough having sloping sides; and c. third means defined by said cartridge for cooperating with a third one of said one of said alignment features so as to define a rotation about said line wherein said third one of said alignment features and said third cooperating means respectively comprise a generally spherical boss and a flat, whereby the position of said cartridge is exactly constrained with respect to said carriage.

2. The ink jet print cartridge claimed in claim 1, wherein said carriage further includes a planar array of electrical contacts lying in a plane defined by said triangular pattern of alignment features and said cartridge further comprises a planar array of electrical contacts arranged to mate with the contacts on said carriage.

3. A carriage for receiving an ink jet print cartridge in a constrained position in an ink jet printer, the cartridge defining three alignment features arranged in a triangular pattern, comprising:

a. first means defined by said carriage for cooperating with a first one of said alignment features so as to define a point wherein said first one of said alignment features and said first cooperating means respectively comprise a generally spherical boss and a conical recession;

b. second means defined by said carriage for cooperating with a second of said alignment features so as to define a line through said point wherein said second one of said alignment features and said second cooperating means respectively comprise a generally spherical boss and a trough having sloping sides;

c. third means defined by said carriage for cooperating with a third one of said alignment features so as to define a rotation about said line wherein said third one of said alignment features and said third cooperating means respectively comprise a generally spherical boss and a flat; whereby the position of said cartridge is exactly constrained with respect to said carriage.

4. The carriage claimed in claim 3, wherein said cartridge includes a planar array of electrical contacts lying in a plane, defined by the triangular pattern of alignment features, and said carriage further comprises a planar array of electrical contacts arranged to mate with the contacts on said cartridge.

5. The carriage claimed in claim 3, further comprising means for urging said cartridge into engagement with said alignment features.

6. The carriage claimed in claim 5, wherein said means for urging is a cam.

7. An ink jet print cartridge for use in an ink jet printer having a carriage for receiving a cartridge in a constrained position, the carriage defining three generally spherical alignment features arranged in a triangle, comprising:

a. a conical alignment feature defined by said cartridge arranged so as to cooperate with a first one of said generally spherical alignment features to define a point;

b. a trough alignment feature defined by said cartridge arranged so as to cooperate with a second one of said generally spherical alignment features to define a line through said point; and c. a plane alignment feature defined by said cartridge arranged so as to cooperate with a third one of said generally spherical alignment features to define an angle of rotation about said line, whereby the position of said cartridge is exactly constrained with respect to said carriage in six degrees of freedom.

8. A carriage for receiving an ink jet print cartridge in an ink jet printer, the cartridge defining a conical alignment feature, a trough alignment feature, and a plane alignment feature arranged in a triangle, comprising:

a. a first generally spherical alignment feature defined by said carriage arranged so as to cooperate with said conical alignment feature to define a point;

b. a second generally spherical alignment feature defined by said carriage arranged so as to cooperate with said trough alignment feature to define a line through said point; and c. a third generally spherical alignment feature defined by said carriage arranged so as to cooperate with said plane alignment feature to define an angle of rotation about said line.

9. A system for exactly constraining a position of an ink cartridge in a carriage in an ink jet printer, comprising:

a. first alignment means for defining a point wherein said first alignment means comprises a generally spherical boss and a conical depression;

b. second alignment means for defining a line through said point wherein said second alignment means comprises a generally spherical boss and a trough; and c. third alignment means for defining an angle of rotation about said line wherein said third alignment means comprises a generally spherical boss and a flat.

* * * * *